United States Patent [19]

Sakurai et al.

[11] Patent Number: 5,693,367
[45] Date of Patent: Dec. 2, 1997

[54] PROCESS FOR PRODUCING A POWDER MATERIAL FOR AN ELECTRO-RHEOLOGICAL FLUID

[75] Inventors: Ryo Sakurai; Tasuku Saito, both of Kodaira, Japan

[73] Assignee: Bridgestone Corporation, Tokyo, Japan

[21] Appl. No.: 618,172

[22] Filed: Mar. 19, 1996

[30] Foreign Application Priority Data

| Mar. 24, 1995 | [JP] | Japan | 7-066434 |
| Mar. 24, 1995 | [JP] | Japan | 7-066435 |
| Oct. 11, 1995 | [JP] | Japan | 7-263066 |

[51] Int. Cl.$^6$ ............................................. B05D 7/04
[52] U.S. Cl. ................... 427/212; 427/399; 252/71; 252/73; 252/74; 252/572; 423/460
[58] Field of Search ..................... 427/212, 399; 252/71, 73, 74, 572; 423/460

[56] References Cited

U.S. PATENT DOCUMENTS

| 5,252,249 | 10/1993 | Kurachi et al. | 252/71 |
| 5,332,517 | 7/1994 | Torii et al. | 252/73 |

FOREIGN PATENT DOCUMENTS

| 53-93186 | 8/1978 | Japan . |
| A-59-30887 | 2/1984 | Japan . |
| B2-60-31211 | 7/1985 | Japan . |
| A-61-216202 | 9/1986 | Japan . |
| A-62-95397 | 5/1987 | Japan . |
| A-63-97694 | 4/1988 | Japan . |
| A-1-164823 | 6/1989 | Japan . |
| A-3-47896 | 2/1991 | Japan . |

*Primary Examiner*—Shrive Beck
*Assistant Examiner*—Bret Chen
*Attorney, Agent, or Firm*—Oliff & Berridge

[57] ABSTRACT

A process for producing a powder material for an electro-rheological fluid is provided. The powder material is advantageously used for an electro-rheological fluid having a property, such as viscosity, which changes by application of an electric field. A powder material for an electro-rheological fluid having a uniform distribution of particle diameters and a uniform distribution of electric conductivity can be produced by embrittling a carbonaceous powder material, pulverizing and classifying the embrittled carbonaceous powder material to obtain a carbonaceous powder material having a uniform distribution of particle diameters, and carbonizing the powder material under an atmosphere of an inert gas.

9 Claims, No Drawings

PROCESS FOR PRODUCING A POWDER MATERIAL FOR AN ELECTRO-RHEOLOGICAL FLUID

FIELD OF THE INVENTION

The present invention relates to a process for producing a powder material for an electro-rheological fluid. More particularly, the present invention relates to a process for producing a powder material for an electro-rheological fluid by which a powder material for an electro-rheological fluid can be easily produced which has a uniform distribution of particle diameters as well as a uniform distribution of electric conductivity, at lower cost.

PRIOR ART OF THE INVENTION

An electro-rheological fluid is a fluid having viscoelastic properties which can be changed to a great degree and reversibly by electric control. A phenomenon in which apparent viscosity of a fluid is changed to a great degree by application of an electric field has been known as Winslow Effect for a long time. Application of an electro-rheological fluid to an apparatus or a part of an apparatus, such as a clutch, a valve, an engine mount, an actuator or a robot arm, as a component which electrically controls the apparatus and the part has been attempted. However, electro-rheological fluids of the early period were prepared by dispersing a powder material, such as starch, in a mineral oil or a lubricant, and had a drawback in that reproducibility was inferior even though the electro-rheological effect was exhibited.

Many proposals mainly relating to a powder material used as a dispersed phase fluid have been made in order to obtain a fluid having a greater electro-rheological effect and superior reproducibility. For example, highly water-absorbing resins having an acid group, such as polyacrylic acid, are described in Japanese Patent Application Laid-Open (JP-A) 53(1978)-93186. Ion exchange resins are described in Japanese Patent Publication (JP-B) 60(1985)-31211. Alumina silicate is described in Japanese Patent Application Laid-Open (JP-A) 62(1987)-95397. The powder materials described above are hydrophilic powder materials in a solid form. An electro-rheological fluid is prepared by hydrating the powder material described above and dispersing it in an electric insulating oily medium. When a high voltage is applied to the fluid, it is considered that polarization takes place in the particles constituting the powder material by the effect of water contained therein, and viscosity of the fluid increases by crosslinks formed between the particles in the direction of the electric field because of the polarization.

However, the electro-rheological fluids using the water-containing powder materials described above have many problems that they do not provide sufficient electro-rheological effect in a wide range of temperature, that the temperature of use is restricted to avoid vaporization or freezing of water, that the used electric current increases by increase in the temperature, that migration of water causes instability, and that electrode metals are corroded by application of a high voltage. Thus, practical application of the electro-rheological fluids described above is difficult.

In order to solve these problems, an-hydrous electro-rheological fluids which do not use any water-containing particles were proposed. For examples, organic semi-conductive particles, such as polyathenequinone and the like, are described in Japanese Patent Application Laid-Open (JP-A) 61(1986)-216202. Dielectric particles prepared by forming an electric conductive thin film on the surface of an organic or inorganic solid particles and an electric insulating thin film on the thus formed electric conductive thin film, in other words, complex particles coated with thin films which comprise thin films having a combination of electric conductivity and electric insulation as the essential components thereof, are described in Japanese Patent Application Laid-Open (JP-A) 63(1988)-97694 and Japanese Patent Application Laid-Open (JP-A) 1(1989)-164823. A surface-treated metal particles and inorganic powders coated with a metal are known as dipersoids whose electric properties are controlled. However, all the anhydrous electro-rheological fluids using the powder materials described above have problems that a sufficient electro-rheological effect cannot be obtained under a low electric power consumption, that industrial production thereof is difficult, and that the fluids exhibit the electro-rheological effect only when an alternating electric field is applied. Thus, the an-hydrous electro-rheological fluids using the powder materials have not practically been used.

In order to solve these problems, the present inventors proposed in Japanese Patent Application Laid-Open (JP-A) 3(1991)-47896 a an-hydrous electro-rheological fluid which comprises a carbonaceous fine powder material having a specific particle diameter and an electric insulating oil having a specific viscosity, exhibits a high electro-rheological effect, and consumes low electric power. As is disclosed in the above patent application, use of a powder material having a uniform distribution of particle diameters as the powder material of an electro-rheological fluid is advantageous. In general, in order to obtain a powder material having a uniform distribution of a specific particle diameters for an electro-rheological fluid, the distribution of particle diameters of the carbonaceous powder material is made uniform before carbonization, or the powder material is pulverized and classified after carbonization.

However, pulverizing a powder material of a resin, such as a thermosetting resin generally used as the material of an electro-rheological fluid, is substantially impossible because the resin has elasticity. Thus, it is difficult to obtain a powder material having a uniform distribution of particle diameters from such a resin. Therefore, a powder material having a uniform distribution of particle diameters is obtained in advance by the emulsion process or the like when the resin is prepared, and then the obtained powder material is used for carbonization. However, the process to obtain the powder material having a uniform distribution of particle diameters becomes complicated to cause a higher cost of production.

On the other hand, when powder materials are prepared from various types of carbonaceous powder material, such as thermosetting resins or conventional coal tar pitch by carbonization of the carbonaceous powder materials and subsequent pulverization and classification of the carbonized materials, a drawback is found in that a uniform distribution of electric conductivity of the obtained powder materials cannot be achieved because the powder materials are not uniformly carbonized when they are microscopically examined, and the electro-rheological fluids prepared by using the powder materials are inferior in the electro-rheological property.

SUMMARY OF THE INVENTION

An object of the present invention is accordingly to solve the problems described above and provide a process for producing a powder material for an electro-rheological fluid having a uniform distribution of particle diameters and a uniform distribution of electric conductivity.

Another object of the present invention is to provide a process for producing such a powder material for an electro-rheological fluid easily at a lower cost.

Thus, the process for producing a powder material for an electro-rheological fluid of the first aspect of the present invention comprises carbonizing a carbonaceous powder material under an atmosphere of an inert gas, pulverizing and classifying the carbonized carbonaceous powder material in order to obtain a carbonaceous powder material having a uniform distribution of particle diameters, and carbonizing the carbonaceous powder material having a uniform distribution of particle diameters under an atmosphere of an inert gas again. By pulverizing the carbonaceous powder material after hardening the surface thereof, the operation of pulverization is facilitated. Moreover a carbonaceous powder material having a uniform distribution of particle diameters can be obtained by a conventional process for classification without aggregation of the particles formed by the pulverization. In the subsequent carbonization, aggregation by melting of the particles can be prevented because the surface of the powder material treated above is hardened. Uniform carbonization of the particles can be achieved because the particles have a uniform distribution of diameters. Therefore, a powder material having a uniform distribution of electric conductivity can be obtained.

Thus, this process for producing a powder material for an electro-rheological fluid also comprises carbonizing a carbonaceous powder material under an atmosphere of an inert gas, preparing a carbonaceous powder material having a uniform distribution of particle diameters by pulverizing and classifying the carbonized carbonaceous powder material, and again carbonizing the carbonaceous powder material having a uniform distribution of particle diameters under an atmosphere of an inert gas.

In the process for producing a powder material for an electro-rheological fluid in which a carbonaceous powder material is carbonized, the carbonaceous powder material is selected from the group consisting of naphthalene pitch, coal tar pitch, and thermosetting resins.

The carbonaceous powder material having a uniform distribution of particle diameters which is obtained by pulverization and classification of the carbonized carbonaceous powder material preferably has an average particle diameter of 0.01 to 100 µm.

It is preferred that the carbonaceous powder material used as the starting material is carbonized under an atmosphere of an inert gas at a temperature of 100° to 600° C., and that the carbonaceous powder material after classification is carbonized under an atmosphere of an inert gas at a temperature of 200° to 600° C.

The process for producing a powder material for an electro-rheological fluid of the second aspect of the present invention comprises hardening a carbonaceous material by a treatment which comprises mixing ethyl silicate with the carbonaceous material and adding a hardening agent to the mixture of ethyl silicate and the carbonaceous material; pulverizing and classifying the hardened carbonaceous material in order to obtain a hardened carbonaceous powder material having a uniform distribution of particle diameters; and carbonizing the hardened carbonaceous powder material having a uniform distribution of particle diameters under an atmosphere of an inert gas.

The carbonaceous material used as the starting material in the process described above is preferably a thermosetting resin such as liquid phenol resin.

More specifically, in the hardening treatment described above, it is preferred that 10 to 50 parts by weight of ethyl silicate is mixed with 100 parts by weight of the carbonaceous material. It is preferred to add ethyl silicate into the powdery thermosetting resin and mix them, so as to coat the surface of the resin with ethyl silicate, followed by addition of an acid catalyst thereinto and heat-treatment.

The carbonaceous powder material having a uniform distribution of particle diameters which is obtained by pulverization and classification of the powder material after the hardening treatment preferably has an average particle diameter of 0.01 to 100 µm.

In the process, carbonaceous powder material having a uniform distribution of particle diameters is carbonized under an atmosphere of an inert gas at a temperature of 400° to 600° C.

DETAILED DESCRIPTION OF THE INVENTION

The present invention will be described in detail in the following.

The carbonaceous material that is used as the starting material in the process for producing a powder material for an electro-theological fluid of the first and second aspects of the present invention contains preferably 80 to 97% by weight, more preferably 85 to 95% by weight of carbon, and has an atomic ratio of carbon to hydrogen (a C/H ratio) preferably in the range of 1.2 to 5, more preferably in the range of 2 to 4.

It has been known for a long time that the electric resistance of the dispersed phase of an electro-rheological fluid is generally in the semi-conductive region [W. M. Winslow: J. Appl. Physics, Volume 20, Page 1137 (1949)]. A carbonaceous material containing less than 80% by weight of carbon and having a C/H ratio of less than 1.2 is an electric insulating material, and a fluid exhibiting the electro-rheological effect can be scarcely obtained from this material. A carbonaceous powder material containing more than 97% by weight of carbon and having a C/H ratio of more than 5 is close to an electric conductive material. An excess current is generated by application of a voltage, and no fluid exhibiting the electro-theological effect can be obtained from this material.

In the process of the first aspect of the present invention, examples of the material having a C/H ratio suitable for the powder material for an electro-rheological fluid include: fine powder materials obtained by pulverization of coal tar pitch, petroleum pitch, or pitch obtained by heat decomposition of polyvinyl chloride; fine powder materials of various types of mesophase obtained by heat treatment of these pitches or tar components, in other words, fine powder materials obtained by removing pitch components from optically anisotropic microspheres (spherulites or mesophase microspheres, which are formed by heat treatment of the pitches or the tar components described above) by dissolving the pitch components in a solvent; fine powder materials obtained by further pulverization of the fine powder materials of such a mesophase as above; fine powder materials obtained by pulverizing materials of a bulk mesophase which are formed by heat treatment of pitch materials (for example, a material described in Japanese Patent Application Laid-Open (JP-A) 59(1984)-30887); powder materials obtained by fine pulverization of partly crystallized pitches; fine powder materials of so called low temperature-treated carbons, such as materials obtained by carbonization of thermosetting resins such as phenol resins, furan resins and melamine resins, at a low temperature; powder materials obtained by fine pulverization of coal such as anthracite or bituminous coal, or heat treated products of coal; carbon spheres obtained by heating a mixture of a hydrocarbon polymer such as polyethylene, polypropylene or polystyrene, or a vinyl polymer, with a chlorine-containing polymer such as polyvinyl chloride or polyvinylidene chloride, under a pressure; cellulose spheres; spheres of unsaturated polyesters; and the like materials. When the carbonaceous powder material contains ionic impurities, the ionic impurities are preferably removed in advance.

The carbonaceous powder material used as the starting material in the present invention has an average particle diameter in the range of about 0.01 to about 1000 μm, preferably in the range of 0.1 to 1000 μm. An average diameter of more than 1000 μm is not preferred because pulverization becomes difficult. The carbonaceous powder material used as the starting material is not required to have a uniform distribution of particle diameters, and has a broad distribution of particle diameters. Thus, the carbonaceous powder material used as the starting material has less restriction for use, and the material cost can be reduced.

In the first stage of the process for producing a powder material for an electro-rheological fluid which process is the first aspect of the present invention, the carbonaceous powder material is carbonized under an atmosphere of an inert gas to harden the surface thereof as follows.

The carbonization in the first stage has the object of making the carbonaceous powder material itself hardened to facilitate the pulverization and classification in the second stage. The degree of hardening of the carbonaceous powder material obtained under certain condition of the carbonization is different depending upon the type of the carbonaceous powder material. In general, a preferable degree of hardening can be obtained by carbonizing the carbonaceous powder material under an atmosphere of an inert gas at a temperature in the range of 100° to 600° C. for a time in the range of 0.5 to 10 hours. When the temperature of carbonization is lower than 100° C. or the time of carbonization is less than 0.5 hours, finely-pulverizing the carbonaceous powder material is difficult because of elasticity of the powder material. When the temperature of carbonization is higher than 600° C. or the time of carbonization is more than 10 hours, the carbonaceous powder material is excessively embrittled, and obtaining a preferred particle diameter by pulverization becomes difficult. Thus, a temperature or a time outside of the respective specified ranges is not preferable. For example, when the carbonaceous powder material is a powder material of a thermosetting resin, such as a powder material of a phenol resin, the material is preferably treated with heat at 450° C. to 550° C. for 1.5 to 2.5 hours.

The inert gas described above is, for example, nitrogen gas or a rare gas, such as argon gas, helium gas, xenon gas, or the like. Among these gases, nitrogen gas and argon gas are preferred because they are easily available.

In the carbonization in the first stage of the process that is the first aspect of the present invention, it is preferred that a treatment for suppressing melt adhesion of the surface of the carbonaceous powder material is conducted before the carbonization. For example, when as the carbonaceous powder material a material is used which is softened at the surface by a heat treatment though the material has some degree of heat resistance, it is preferred that the surface of the material is subject to a treatment which can prevent melt adhesion of the surface, in advance. In the surface treatment, a carbonaceous material, for example a powder material of a resin prepared to have a uniform distribution of particle diameters, is treated by: (1) hardening of the surface by a wet process, (2) hardening of the surface by a dry process, (3) a treatment with a surface active agent, or (4) formation of a heat resistant coating layer, such as a layer of silica or a layer of a fluorine-containing substance. As more specific examples of the surface treatment, examples of (1) hardening of the surface by a wet process include heat treatment of a resin having the spherical shape in an aqueous solution of an acid, such as hydrochloric acid, sulfuric acid or oxalic acid; examples of (2) hardening of the surface by a dry process include heat treatment of a resin under an atmosphere of oxygen to prevent the melting; examples of (3) treatment with a surface active agent include immersion of a resin into a silicone surface active agent, followed by drying; and examples of (4) formation of a heat resistant coating layer include a process comprising dispersion of a resin having the spherical shape in ethyl silicate to coat the surface with ethyl silicate, dispersion of the coated resin in water together with an acid catalyst, and hydrolysis of ethyl silicate on the surface of the coated resin by heat treatment to form a coating layer of silica on the surface of the resin.

As described above, melt adhesion of particles of the carbonaceous powder material used as the starting material during the carbonization can be prevented by the surface treatment which suppresses the melt adhesion of the surface under the condition of the carbonization reaction of the carbonaceous powder material. Therefore, the surface treatment provides advantages that the uniformity of the distribution of particle diameters of the obtained powder material is further increased, and that the pulverization and classification processes are further facilitated.

In the second stage of the process which is the first aspect of the present invention, a carbonaceous powder material having a uniform distribution of particle diameters is obtained by pulverization and classification of the carbonaceous powder material which has been carbonized. The carbonaceous powder material which has been carbonized in the first stage can easily be pulverized because the surface is already hardened. As the apparatus used for the pulverization and classification, any conventional apparatus for pulverization and classification may be used which can produce a powder material having a particle diameter of 100 μm or less. It is also possible that the carbonaceous powder material which has been pulverized in an apparatus for pulverization is classified by a separate apparatus for classification to obtain a powder material having a desired particle diameter. Examples of the apparatus for pulverization include conventional apparatuses for pulverization, such as a ball mill, a sand mill, an atritor, a jet pulverizer, a colloid mill, and the like. In the pulverization, an auxiliary agent for pulverization may be added as long as the advantageous properties of the ultimately obtained powder material for an electro-rheological fluid are not adversely affected. As the apparatus for classification, a sieve, an apparatus for classification using a fluid, or the like, may be used.

The average particle diameter of the powder material can be measured with use of an apparatus for measurement of a particle diameter, such as that described in Examples (for example, MICROTRAC SPA/MK-II type, a product of Nikkiso Co., Ltd.). The average particle diameter of a powder material after the classification is preferably about 0.01 to about 100 μm, more preferably 0.1 to 20 μm, and most preferably 0.5 to 5 μm. When the particle diameter is less than 0.01 μm, initial viscosity of the electro-theological fluid obtained by using the powder material is excessively high. When the particle diameter is more than 100 μm, stability of the dispersion of the powder material is inferior. Thus, a particle diameter outside of the specified range is not preferable.

In the third stage of the process which is the first aspect of the present invention, a powder material for an electro-theological fluid having a specified electric conductivity and a uniform distribution of particle diameters can be obtained by carbonizing the thus obtained carbonaceous powder material having a uniform distribution of particle diameters under an atmosphere of an inert gas.

The carbonization in the third stage is conducted to obtain a powder material for an electro-rheological fluid having a preferable electric conductivity. It is preferred for achieving the object that the carbonaceous powder material is carbonized by a heat treatment under an atmosphere of an inert gas similar to that used for the carbonization in the first stage at a temperature in the range of 200° to 600° C. for a time in the range of 0.5 to 10 hours.

The process for producing a powder material for an electro-rheological fluid which process is the second aspect of the present invention is as follows. In the first stage, the carbonaceous material is treated in order to facilitate pulverization. The treatment of the carbonaceous material in the first stage has the object of making the carbonaceous material itself brittle to facilitate pulverization and classification in the second stage. Therefore, the treatment is preferably conducted to such a degree that the carbonaceous material which has been subjected to the embrittlement process can be easily pulverized to a fine powder by a conventional pulverizing apparatus, such as a roll mill.

Specifically, in the first stage, the carbonaceous material is hardened by a treatment which comprises mixing ethyl silicate with the carbonaceous material and adding a hardening agent to the mixture of ethyl silicate and the carbonaceous material. In the case in which the carbonaceous material used as a starting material is a powder, more specifically, the carbonaceous powder material is mixed well with ethyl silicate so that the surface of the carbonaceous powder material is coated with ethyl silicate, and an acid catalyst is added to the coated powder material. If desired, the resultant mixture is dispersed in water, and ethyl silicate is hydrolyzed by treating the resultant mixture or dispersion with heat. Thus, a coating layer of silica is formed on the surface of the powder material, and the carbonaceous powder material is embrittled. In the process described above, the dispersion in water and the treatment with heat are not always necessary. However, it is preferred that these processes are conducted because the embrittlement can be achieved more efficiently in a shorter time.

As the carbonaceous powder material used in the treatment with ethyl silicate, a powder material of a thermosetting resin is preferable because of the homogeneity of the material and superior properties of the obtained electro-rheological fluid.

The thermosetting resin used for the carbonaceous material in the process of the second aspect of the present invention includes such a phenol resin and an unsaturated polyester resin above, as well as a furan resin, a melamine resin, an epoxy resin, a polydimethylsilane resin, an alkyd resin, an allyl resin, a urea resin, a silicone resin or a polyurethane resin. Among these resins, a phenol resin, an unsaturated polyester resin, a furan resin, a melamine resin, an epoxy resin, and the like, are preferably used. The hardening agent is selected in accordance with the used resin. Examples of the suitable hardening agent are as follows: hexamethylenetetramine, toluenesulfonic acid, or the like is used for a phenol resin. A peroxide, such as benzoyl peroxide, methyl ethyl ketone peroxide, or the like, is used for an unsaturated polyester resin. An ammonium salt, an alkanolamine salt, a metal salt, an organic acid, or the like, is used for an amino resin, such as a urea resin or melamine resin. An organic acid anhydride, a polyamine, or the like, is used for an epoxy resin.

Ethyl silicate which is mixed with the thermosetting resin is a liquid material and available, for example, from Colcoat Company as Ethyl Silicate 40 (a trade name). The amount of ethyl silicate mixed with the thermosetting resin is not particularly limited as long as ethyl silicate mixed with the thermosetting resin can achieve the object of the embrittlement. It is generally preferred that 3 to 50 parts by weight of ethyl silicate is mixed with 100 parts by weight of the thermosetting resin.

More specifically, the treatment in the first step is conducted by adding a specific amount of ethyl silicate to a thermosetting resin, for example a phenol resin, in a liquid form, mixing ethyl silicate and the thermosetting resin well to uniformly disperse ethyl silicate in the thermosetting resin, adding a hardening agent for the thermosetting resin to the prepared mixture, and hardening the thus obtained mixture. The amount of the hardening agent added to the mixture is the same as that usually used for the thermosetting resin. Because the mixture of the thermosetting resin prepared above is in a bulk form, it is preferred that the mixture is preliminarily pulverized to facilitate the pulverization and classification in the next stage. The preliminary pulverization can be conducted by a conventional method. For example, the mixture in the bulk form is pulverized to obtain a powder material having a particle diameter of 1 mm or less by using a means of pulverization, such as a hammer mill produced by Hosokawa Micron Co., Ltd.

In the first stage of the process, the embrittlement of the thermosetting resin can also be conducted by using a powder material of a thermosetting resin as the starting material in accordance with a process comprising adding ethyl silicate to the thermosetting resin, mixing ethyl silicate and the thermosetting resin to coat the surface of the particles of the thermosetting resin with ethyl silicate, adding an acid catalyst to the coated thermosetting resin, and treating the resultant mixture with heat to coat the surface of the particles of the thermosetting resin with silica. The powder material of the thermosetting resin used above has an average particle diameter of about 0.01 to about 1000 μm, preferably 0.1 to 1000 μm. An average diameter of more than 1000 μm is not preferred because the pulverization becomes difficult. The carbonaceous powder material used as the starting material is not required to have a uniform distribution of particle diameter, and has a broad distribution of particle diameter. Thus, the carbonaceous powder material used as the starting material has less restriction for use, and the material cost can be reduced. Specific examples of the acid catalyst include para-toluenesulfonic acid and the like.

In the second stage of the process, a powder material having a uniform distribution of particle diameter is obtained by pulverizing and classifying the hardened thermosetting resin or the thermosetting resin coated with silica on the surface described above. The resin embrittled by using ethyl silicate in the first stage can easily be pulverized because it has a lower modulus and a higher hardness than conventional thermosetting resins. As the apparatus used for the pulverization and classification, any conventional apparatus for pulverization and classification may be used which can provide a powder material having a particle diameter of 1000 μm or less. It is also possible that the carbonaceous powder material which has been pulverized in an apparatus for pulverization is classified by a separate apparatus for classification to obtain a powder material having a specified particle diameter. As the apparatus for pulverization and classification, the same apparatus as that described in the first embodiment of the present invention, in which a carbonaceous powder material is carbonized under an atmosphere of an inert gas, can be used.

The average particle diameter of the powder material after the pulverization and classification is preferably about 0.01 to about 100 µm, more preferably 0.1 to 20 µm, and most preferably 0.5 to 5 µm. When the average particle diameter is less than 0.01 µm, initial viscosity of the electro-rheological fluid obtained by using the powder material is excessively high. When the particle diameter is more than 100 µm, stability of the dispersion of the powder material is inferior. Thus, a particle diameter outside of the specified range is not preferable.

In the third stage of the process, a powder material for an electro-rheological fluid having a specified electric conductivity and a uniform distribution of particle diameter can be obtained by carbonizing the thus obtained carbonaceous powder material having a uniform distribution of particle diameters under an atmosphere of an inert gas.

The inert gas is, for example, nitrogen gas or a rare gas, such as argon gas, helium gas, xenon gas, or the like. Among these gases, nitrogen gas and argon gas are preferred because they are easily available.

The carbonization in the third stage is conducted to obtain a powder material for an electro-rheological fluid having a preferable electric conductivity. It is preferred for achieving this object that the carbonaceous powder material obtained after the second stage of the process is carbonized by a heat treatment under an atmosphere of an inert gas at a temperature in the range of 400° to 600° C. for a time in the range of 0.5 to 10 hours.

In the carbonization of the third stage of the process of the present invention, it is preferred that a treatment for suppressing melt adhesion of the surface of the carbonaceous powder material under the condition of carbonization reaction is conducted before the carbonization. The treatment for suppressing melt adhesion can be conducted in accordance with the same method as that described above.

An electro-rheological fluid can be obtained by dispersing the thus obtained powder material for an electro-rheological fluid of the present invention in an oily medium having the electric insulating property. The powder material for an electro-rheological fluid as the dispersed phase is contained at a level of 1 to 60% by weight, preferably 20 to 50% by weight, in the electro-rheological fluid. The oily medium as the dispersion medium is contained at a level of 99 to 40% by weight, preferably 80 to 50% by weight, in the electro-rheological fluid. When the dispersed phase content is less than 1% by weight, the electro-rheological effect decreases. When the dispersed phase content is more than 60% by weight, viscosity under the initial condition with no application of a voltage is excessively high. Thus, an amount of the dispersed phase outside of the specified range is not preferable.

The oily medium having the electric insulating property used as the dispersion medium preferably has a volume resistivity of $10^{11}$ Ω.m or more, more preferably $10^{13}$ Ω.m or more, at 80° C. Examples of the oily medium include hydrocarbon oils, ester oils, aromatic oils, silicone oils, and the like. Specific examples of the oily medium include aliphatic monocarboxylic acids, such as neocapric acid; aromatic monocarboxylic acids, such as benzoic acid; aliphatic dicarboxylic acids, such as adipic acid, glutaric acid, sebacic acid, and azelaic acid; aromatic dicarboxylic acids, such as phthalic acid, isophthalic acid, and tetrahydrophthalic acid; dimethylpolysiloxane; methylphenylpolysiloxane; and derivatives of these compounds. These compounds may be used singly or as a combination of two or more types. Among the compounds, silicone oils, such as dimethylpolysiloxane and methylphenylpolysiloxane, and derivatives of the silicone oils are preferable because of no occurrence of aging when the medium is brought into direct contact with materials having rubbery elasticity as well as with various types of polymer materials.

The oily medium having the electric insulating property has a viscosity of 0.65 to 500 centistokes, preferably 5 to 200 centistokes, and more preferably 10 to 50 centistokes, at 25° C. The powder material of the dispersed phase can be effectively dispersed with stability when a dispersion medium of a suitable viscosity is used. When the viscosity of the oily medium is more than 500 centistokes, initial viscosity of the electro-rheological fluid increases, and change of the viscosity by the electro-rheological effect under the application of a voltage decreases. When the viscosity of the oily medium is less than 0.65 centistokes, the oily medium tends to vaporize, and stability of the dispersion medium deteriorates.

To the electro-rheological fluid, additives such as other dispersed phase powder materials, surface active agents, dispersants and inorganic salts may be added within the range that the advantageous properties of the powder material for an electro-rheological fluid obtained by the present invention is not adversely affected.

EXAMPLES

The invention will be understood more readily with reference to the following examples; however, these examples are intended to illustrate the invention and are not to be construed to limit the scope of the invention.

Evaluation of the properties (1) Measurement of particle diameters of a powder material The particle diameters of a powder material for an electro-rheological fluid were measured by using MICROTRAC SPA/MK-II apparatus, a product of Nikkiso Co., Ltd.

(2) Viscosity of an electro-theological fluid and density of electric current through an electro-rheological fluid The viscosity of an electro-rheological fluid under the initial condition and under the application of a voltage of 2 kV/mm, and the density of electric current through the electro-rheological fluid under the application of a voltage of 2 kV/mm, were measured by using RDS-II Type Apparatus produced by Rheometrics Far East Company at a room temperature (about 25° C.) under a shear rate of 350/second.

(3) Evaluation of dispersion stability

After an electro-rheological fluid was left standing at 25° C. for 24 hours, the condition of the fluid was visually observed. When no precipitation of particles was found, the result is shown by the mark ○. When precipitation of particles was found, the result is shown by the mark x.

(4) Evaluation of uniformity of the distribution of electric conductivity of a powder material The peak of dielectric loss of an electro-rheological fluid was measured by changing the frequency from 10 Hz to $10^7$ Hz. The value of convergence of the obtained permittivity at the lower frequency ($\epsilon_l$) was set as 1, and the value of convergence of the obtained permittivity at the higher frequency ($\epsilon_h$) was set as 0. The obtained permittivities were normalized by using these values. The obtained permittivities were also normalized by setting the value of dielectric loss at the relaxation frequency ($f_0$) as 1. The frequency $f_1$ was obtained as the frequency giving a dielectric loss of 0.5 at the side of frequency higher than $f_0$, and the value of $\log(f_1/f_0)$ was calculated. When the value of $\log(f_1/f_0)$ was 0.95 or less, the electric conductivity was regarded to be uniform, and the result is shown by the mark ○. When the value of $\log(f_1/f_0)$ was more than 0.95, the electro-rheological fluid had a large variation of the electro-rheological property with time, and the result is shown by the mark x.

(Example 1)

A phenol resin of a novolak type (a product of Asahi Yukizai Co., Ltd.) in an amount of 500 g was carbonized under an atmosphere of argon at 500° C. for 2 hours to give 300 g of a carbonized powder material. The carbonized powder material was treated with an apparatus for pulverization and classification (a product of Nisshin Engineering Co., Ltd.) under an air pressure of 5.0 kg/m² to obtain a powder material having a uniform distribution of particle diameter and an average particle diameter of about 4 μm. The thus obtained powder material was further carbonized under an atmosphere of argon at 560° C. for 2 hours to produce a powder material for an electro-rheological fluid having an average particle diameter of about 4 μm.

The spherical powder material of a carbonaceous powder material obtained as above in an amount of 30% by weight was dispersed well in 60% by weight of a silicone oil having a viscosity of 10 centistokes at 25° C. (a product of Toshiba Silicone Co., Ltd.; TSF451-10) used as the dispersion medium. The thus obtained electro-rheological fluid is hereinafter referred to as Product 1 of the present invention.

The viscosity under the initial condition, and the viscosity and the density of electric current under the application of a voltage of 2 kV/mm were measured with the obtained electro-rheological fluid. The results are shown in Table 1. The condition of dispersion in the fluid was visually observed after the fluid was left standing for 24 hours. The uniformity of the distribution of electric conductivity was also evaluated. The results are shown in Table 1.

(Example 2)

A mesophase pitch obtained by polymerization of naphthalene (a product of Mitsubishi Gas Chemical Co., Ltd.; AR-1) in an amount of 300 g was placed in an electric oven, and the temperature of the oven was increased to 300° C. at the rate of 10° C./minute. Then, the mesophase pitch was carbonized under an atmosphere of argon at 300° C. for 3 hours to obtain 286 g of a carbonized powder material. The carbonized powder material was treated with an apparatus for pulverization and classification (a product of Nisshin Engineering Co., Ltd.) under an air pressure of 5.0 kg(f)/m² to give a powder material having a uniform distribution of particle diameter and an average particle diameter of about 3.6 μm. The obtained powder material was placed again in the same electric oven, and the temperature of the oven was increased to 420° C. at the rate of 5° C./minute. Then, the powder material was further carbonized under an atmosphere of argon at 420° C. for 2 hours to obtain a powder material for an electro-rheological fluid having an average particle diameter of about 3.6 μm.

By using the carbonaceous powder material obtained as above, an electro-rheological fluid was prepared in accordance with the same method as that in Example 1. The thus obtained electro-rheological fluid is hereinafter referred to as Product 2 of the present invention.

The obtained electro-rheological fluid was evaluated in accordance with the same methods as those in Example 1. The results are shown in Table 1.

(Example 3)

A conventional pitch obtained from coal tar pitch with a yield of 35% by weight (a pitch used for spinning of carbon fiber) in an amount of 100 g was placed in an electric oven, and the temperature of the oven was increased to 300° C. at the rate of 3° C./minute. Then, the pitch was carbonized under an atmosphere of argon at 300° C. for 4 hours to give 76 g of a carbonized powder material. The obtained carbonized powder material was treated with an apparatus for pulverization and classification (a product of Nisshin Engineering Co., Ltd.) under an air pressure of 5.0 kg/m² to obtain a powder material having a uniform distribution of particle diameter and an average particle diameter of about 4.6 μm. The obtained powder material was placed again in the same electric oven, and the temperature of the oven was increased to 410° C. at the rate of 5° C./minute. Then, the powder material was further carbonized under an atmosphere of argon at 410° C. for 3 hours to produce a powder material for an electro-rheological fluid having an average particle diameter of about 4.6 μm.

By using the carbonaceous powder material obtained above, an electro-rheological fluid was prepared in accordance with the same method as that in Example 1. The thus obtained electro-rheological fluid is hereinafter referred to as Product 3 of the present invention.

The obtained electro-rheological fluid was evaluated in accordance with the same methods as those in Example 1. The results are shown in Table 1.

(Comparative Example 1)

A novolak-type phenol resin (a product of Asahi Yukizai Co., Ltd.) in an amount of 500 g was treated with pulverization and classification by the same method as that in Example 1. The resin could not be pulverized to particles having an average diameter of less than 30 μm because the resin had elasticity. The obtained powder material of the phenol resin having various particle shapes and an average particle diameter of about 30 μm was carbonized under an atmosphere of argon at 560° C. for 2 hours to produce a powder material for an electro-rheological fluid having various particle shapes.

An electro-theological fluid was obtained by using 40 % by weight of the carbonaceous powder material having various particle shapes obtained above in accordance with the same method as that in Example 1. The thus obtained electro-rheological fluid is hereinafter referred to as Comparative Product 1. The obtained electro-rheological fluid was evaluated in accordance with the same methods as those in Example 1. The results are shown in Table 1. The condition of dispersion in the fluid was visually observed after the fluid was left standing for 24 hours. The carbonaceous powder material was separated as precipitates, and the electro-theological fluid could not maintain the uniformity of the dispersion. The uniformity of the distribution of electric conductivity was also evaluated. The results are shown in Table 1.

(Comparative Example 2)

A novolak-type phenol resin (a product of Asahi Yukizai Co., Ltd.) in an amount of 500 g was carbonized under an atmosphere of argon at 560° C. for 2 hours to obtain 300 g of a carbonized powder material. The obtained carbonized powder material was treated with an apparatus for pulverization and classification (a product of Nisshin Engineering Co., Ltd.) under an air pressure of 5.0 kg/m$^2$ to produce a powder material having a uniform distribution of particle diameter and an average particle diameter of 4 μm.

An electro-rheological fluid was obtained by using 40% by weight of the carbonaceous powder material having a uniform distribution of particle diameter obtained above in accordance with the same methods as those in Example 1. The thus obtained electro-rheological fluid is hereinafter referred to as Comparative Product 2. The obtained electro-rheological fluid was evaluated in accordance with the same methods as those in Example 1. The results are shown in Table 1. The condition of dispersion in the fluid was visually observed after the fluid was left standing for 24 hours, and no precipitation was found. The uniformity of the distribution of electric conductivity was also evaluated. The results are shown in Table 1.

TABLE 1

|  | electro-rheological effect | | | stability of dispersion (after standing for 24 hours) | uniformity of electric conductivity of powder material |
| --- | --- | --- | --- | --- | --- |
|  | initial viscosity (poise) | viscosity under 2 kV/mm (poise) | density of electric current (μA/xm$^2$) | | |
| Product 1 | 0.67 | 13.2 | 1.56 | o | o |
| Product 2 | 0.60 | 11.5 | 2.8 | o | o |
| Product 3 | 0.78 | 10.1 | 3.5 | o | o |
| Comparative Product 1 | 0.51 | 10.1 | 1.84 | X | o |
| Comparative Product 2 | 0.64 | 5.4 | 4.54 | o | X |

As is apparent from the results shown in Table 1, Product 1 of the present invention, which is the electro-rheological fluid obtained by using the powder material for an electro-rheological fluid of the present invention, had, under the application of a voltage, a viscosity of a sufficient level and higher than that under the initial condition. Thus, Product 1 exhibited the excellent effect of the electro-visocity. Product 1 also showed excellent dispersion stability of the powder material for an electro-rheological fluid. The distribution of electric conductivity of the powder material used in Product 1 was also uniform. As opposed to Product 1, Comparative Product 1, i.e. the electro-rheological fluid obtained by using the carbonaceous powder material which was prepared with inferior pulverization and which had various particle shapes, was inferior in the dispersion stability. Comparative Product 2, i.e. the electro-theological fluid obtained by using the carbonaceous powder material which was prepared by carbonization of a carbonaceous powder material and subsequent pulverization and classification and which has a uniform distribution of particle diameter, showed a smaller difference between the viscosities under the initial condition and under the application of a voltage, than those of Products obtained in Examples. Furthermore, the distribution of electric conductivity of Comparative Product 2 was not uniform. Thus, Comparative Product 2 did not show a sufficient electro-rheological effect.

(Example 4)

To 1 kg of a phenol resin in a liquid form (a product of Asahi Yukizai Co., Ltd.; RM3000), 300 g of Ethyl Silicate 40 (a trade name; a product of Colcoat Company) was added, and the resin and ethyl silicate were mixed well. To the mixture, 50 g of toluenesulfonic acid was added as a hardening agent, and a resinous composition in a solid form was obtained. The obtained resinous composition in the solid form was treated with an apparatus for pulverization and classification (a product of Nisshin Engineering Co., Ltd.) under an air pressure of 5.0 kg/m$^2$ to give a powder material having a uniform distribution of particle diameter and an average particle diameter of 3 μm. The obtained powder material was carbonized under an atmosphere of argon at 580° C. for 2 hours to produce a powder material for an electro-rheological fluid containing a silica component and having an average particle diameter of about 3 μm.

The spherical powder material of a carbonaceous powder material obtained above in an amount of 30% by weight was dispersed well in 60% by weight of a silicone oil having a viscosity of 10 centistokes at 25° C. (a product of Toshiba Silicone Co., Ltd.; TSF451-10) used as the dispersion medium. The thus obtained electro-rheological fluid is hereinafter referred to as Product 4 of the present invention.

The viscosity under the initial condition, and the viscosity and the density of electric current under the application of a voltage of 2 kV/mm were measured with the obtained electro-rheological fluid. The results are shown in Table 2. The condition of dispersion in the fluid was visually observed after the fluid was left standing for 24 hours. The uniformity the distribution of electric conductivity was also evaluated. The results are shown in Table 2.

(Comparative Example 3)

To 1 kg of a phenol resin in a liquid form (a product of Asahi Yukizai Co., Ltd.; RM3000), 50 g of toluenesulfonic acid was added as a hardening agent, and a resin composition in a solid form was obtained. The obtained resin composition in the solid form was treated with pulverization and classification by the same method as that in Example 1 by using an apparatus for pulverization and classification (a product of Nisshin Engineering Co., Ltd.). The resin could not be pulverized to particles having an average diameter of less than 30 μm because the resin had elasticity. The obtained powder material of the phenol resin having various particle shapes and an average particle diameter of about 30 μm was carbonized under an atmosphere of argon at 580° C. for 2 hours to obtain a powder material for an electro-theological fluid having various particle shapes.

An electro-rheological fluid was obtained by using 30% by weight of the carbonaceous powder material having various particle shapes obtained above in accordance with the same method as that in Example 4. The thus obtained electro-rheological fluid is hereinafter referred to as Comparative Product 3. The obtained electro-theological fluid was evaluated in accordance with the same methods as those in Example 4. The results are shown in Table 2. The condition of dispersion in the fluid was visually observed after the fluid was left standing for 24 hours. The carbonaceous powder material was separated as precipitates, and the electro-rheological fluid could not maintain the uniformity of the dispersion. The uniformity of the distribution of electric conductivity was also evaluated. The results are shown in Table 2.

(Comparative Example 4)

A powder material of a phenol resin in a solid form obtained by the same method as that used in Comparative Example 3 was preliminarily pulverized to a particle diameter of 1 mm or less by a hammer mill produced by Hosokawa Micron Co., Ltd., and then carbonized under an atmosphere of argon at 580° C. for 2 hours to obtain a carbonaceous powder material. The obtained carbonaceous powder material having various particle shapes was treated again with pulverization and classification by using an apparatus for pulverization and classification (a product of Nisshin Engineering Co., Ltd.) under the same condition as that in Example 1 to produce a powder material for an electro-rheological fluid having an average particle diameter of 3 µm.

An electro-rheological fluid was obtained by using 30% by weight of the carbonaceous powder material having various particle shapes obtained above in accordance with the same method as that in Example 4. The thus obtained electro-rheological fluid is hereinafter referred to as Comparative Product 4. The obtained electro-rheological fluid was evaluated in accordance with the same methods as those in Example 4. The results are shown in Table 2. The condition of dispersion in the fluid was visually observed after the powder material was left standing for 24 hours. No precipitation of the powder material was found. The uniformity of the distribution of electric conductivity was also evaluated. The results are shown in Table 2.

TABLE 2

| | electro-rheological effect | | | stability of dispersion (after standing for 24 hours) | uniformity of electric conductivity of powder material |
|---|---|---|---|---|---|
| | initial viscosity (poise) | viscosity under 2 kV/mm (poise) | density of electric current (µA/xm$^2$) | | |
| Product 4 | 0.63 | 11.3 | 2.42 | o | o |
| Comparative Product 3 | 0.51 | 10.1 | 1.83 | X | o |
| Comparative Product 4 | 0.67 | 4.8 | 3.21 | o | X |

As is apparent from the results shown in Table 2, Product 4 of the present invention, i.e. the electro-rheological fluid obtained by using the powder material for an electro-theological fluid of the present invention, had, under the application of a voltage, a viscosity of a sufficient level and higher than that under the initial condition. Thus, Product 4 exhibited the excellent effect of the electro-viscosity. Product 4 also showed excellent dispersion stability of the powder material for an electro-rheological fluid. The distribution of electric conductivity of the powder material used in Product 4 was also uniform. As opposed to Product 4, Comparative Product 3, i.e. the electro-rheological fluid obtained by using the carbonaceous powder material which was prepared with inferior pulverization and which had various particle shapes, was inferior in the dispersion stability, and could not provide a stable electro-rheological fluid. Comparative Product 4, i.e. the electro-rheological fluid obtained by using the carbonaceous powder material which was prepared by carbonization of a carbonaceous powder material and subsequent pulverization and classification, showed a smaller difference between the viscosities under the initial condition and under the application of a voltage, than those of Products of the present invention. Furthermore, the distribution of electric conductivity of Comparative Product 4 was not uniform. Thus, Comparative Product 4 did not show a sufficient electro-rheological effect.

To summarize the advantages obtained by the invention, the process for producing a powder material for an electro-rheological fluid of the present invention has an advantage that a powder material for an electro-rheological fluid can be easily obtained which has a uniform distribution of particle diameter and a uniform distribution of electric conductivity, with stability.

What is claimed is:

1. A process for producing a powder material for an electro-rheological fluid comprising:

hardening a carbonaceous material by a treatment which comprises mixing ethyl silicate with the carbonaceous material and adding a hardening agent to the mixture of ethyl silicate and the carbonaceous material;

a pulverizing and classifying the hardened carbonaceous material in order to obtain a hardened carbonaceous powder material having a uniform distribution of particle diameters; and carbonizing the hardened carbonaceous powder material having a uniform distribution of particle diameters under an atmosphere of an inert gas.

2. A process for producing a powder material for an electro-rheological fluid according to claim 1, wherein the carbonaceous material is a thermosetting resin.

3. A process for producing a powder material for an electro-theological fluid according to claim 2, wherein 10 to 50 parts by weight of ethyl silicate is mixed with 100 parts by weight of the thermosetting resin.

4. A process for producing a powder material for an electro-rheological fluid according to claim 2, wherein the carbonaceous powder material having a uniform distribution of particle diameters has an average particle diameter of 0.01 to 100 µm.

5. A process for producing a powder material for an electro-rheological fluid according to claim 2, wherein the treatment for hardening the carbonaceous powder material comprises mixing ethyl silicate with the powder material of the thermosetting resin in such a manner that the surface of the powder material of the thermosetting resin is covered with ethyl silicate, adding an acid catalyst to the mixture of ethyl silicate and the powder material of the thermosetting resin, and heating the resultant mixture.

6. A process for producing a powder material for an electro-rheological fluid according to claim 5, wherein the carbonaceous powder material having a uniform distribution of particle diameters has an average particle diameter of 0.01 to 100 µm.

7. A process for producing a powder material for an electro-rheological fluid according to claim 2, wherein the thermosetting resin is liquid phenol resin.

8. A process for producing a powder material for an electro-theological fluid according to claim 1, wherein the carbonaceous powder material having a uniform distribution of particle diameters has an average particle diameter of 0.01 to 100 µm.

9. A process for producing a powder material for an electro-theological fluid according to claim 1, wherein the carbonaceous powder material having a uniform distribution of particle diameters is carbonized under an atmosphere of an inert gas at a temperature of 400° to 600° C.

* * * * *